United States Patent [19]

Yokokoji et al.

[11] 4,168,779
[45] Sep. 25, 1979

[54] PACKAGE FOR STERILIZATION

[75] Inventors: Shyoji Yokokoji, Yashio; Sunao Tsukamoto, Kawaguchi, both of Japan

[73] Assignee: Toppan Printing Co., Ltd., Tokyo, Japan

[21] Appl. No.: 843,279

[22] Filed: Oct. 18, 1977

[30] Foreign Application Priority Data

Nov. 22, 1976 [JP] Japan .................................. 51-140391

[51] Int. Cl.$^2$ ...................... B65D 33/16; B65D 81/20
[52] U.S. Cl. .................................................... 206/439
[58] Field of Search ................ 206/439, 440, 484, 0.5

[56] References Cited

U.S. PATENT DOCUMENTS

| | | | |
|---|---|---|---|
| 3,061,087 | 10/1962 | Scrivens et al. | 206/439 |
| 3,507,386 | 4/1970 | Ichiro et al. | 206/439 |
| 3,595,465 | 7/1971 | Vaillancourt | 206/439 |
| 3,891,089 | 6/1975 | Goodwin et al. | 206/439 |

Primary Examiner—Robert T. Smith
Attorney, Agent, or Firm—Bacon & Thomas

[57] ABSTRACT

A package for sterilization providing for sterilization by gas and also by steam which comprises a base plate formed of a laminate of a paper layer and a plastics layer mainly consisting of butyral resin; and a plastics covering sheet whose edge is heat-sealed to said base plate around a packaged article.

8 Claims, 6 Drawing Figures

PACKAGE FOR STERILIZATION

This invention relates to a package for sterilization providing for sterilization by gas as well as by steam.

Commerically available medical implements have hitherto been marketed in the state received in a package and thereafter sterilized by gas such as ethylene oxide or steam generated in an autoclave. However, most of the conventional packages can be only used for sterilization either by gas or by hot steam.

A package for sterilization providing for sterilization by gas such as ethylene oxide should have sufficient gas permeability or breathability allowing the free emanation of gas to decrease the amount of residual gas as much as possible. On the other hand, a package suitable for sterilization by steam is required to be permeable to steam, heat resistant and waterproof.

Actually, however, no one has so far successfully produced a sterilization package which has such properties as fully meet the above-mentioned requirements and does not give rise to any difficulties in actual use.

The prior art package for sterilization by gas as well as by steam which was required to have sufficient resistance to heat and steam unavoidably tended to have the heat-sealed portion made mechanically strong. When, therefore, the sterilization package was opened, paper particles were often generated due to the paper portion of the base plate being torn to pieces. Particularly where, in the case of steam sterilization, a packaged material, for example, a polyvinyl chloride article had a low heat resistance and a relatively high blocking tendency, then paper particles were free to stick to the packaged article with the resultant pollution.

To date, therefore, there has been experienced the time-consuming work of selecting the kind of sterilization package according to the form of the sterilization process applied or conversely determining the form of the sterilization process according to the kind of sterilization package used.

Moreover, the known sterilization package had further disadvantages that when the sterilized package was opened to take out, for example, a medical implement, the paper portion of the package was likely torn to pieces with the resultant generation of paper particles, which in turn polluted the packaged medical implement by being deposited thereon.

This invention has been accomplished in view of the above-mentioned circumstances, and is intended to provide a package for sterilization admitting of free selection of the form of sterilization, that is, sterilization either by gas such as ethylene oxide or by steam, for example in an autoclave.

Another object of the invention is to provide a package for sterilization which can be easily opened without the possibility of paper particles being generated due to the paper portion being torn to pieces.

According to an aspect of this invention, there is provided a package for sterilization admitting of sterilization by gas as well as by steam which comprises a base plate formed of a laminate of a paper layer and a plastics layer containing at least 60% by weight of butyral resin and a plastics covering sheet whose edge is heat-sealed to the base plate around a packaged article.

This invention can be more fully understood from the following detailed description when taken in conjunction with the accompanying drawings, in which.

Figure 1:
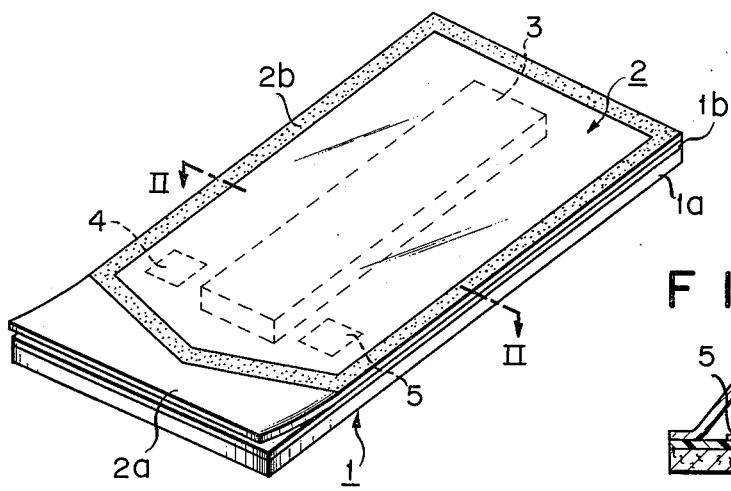
FIG. 1 is an oblique view of a package for sterilization according to one embodiment of this invention.
Figure 2:
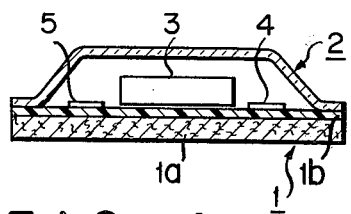
FIG. 2 is a sectional view on line II—II of FIG. 1.

There will now be described by reference to the accompanying drawings a package for sterilization according to the preferred embodiments of this invention. Referring to FIGS. 1 and 2, the present package for sterilization comprises a base plate 1 and a plastics covering sheet 2 whose edge is heat-sealed to one edge portion of the base plate 1. A packaged article 3 is placed between said base plate 1 and covering sheet 2. To describe in greater detail, the base plate 1 is formed of a laminate of a paper layer 1a and a plastics layer 1b mainly consisting of butyral resin. The paper layer 1a is prepared from a gas permeable and germ-proof material, for example, high quality kraft paper sized for a longer length of time than 30 seconds as specified in Japanese Industrial Standards (JIS), p-8122. Where sized for a shorter length of time than 30 seconds, the kraft paper undesirably fails to be sufficiently waterproof. For improvement of said sizing, it is possible to apply a proper amount of styrene-maleic anhydride copolymer, rosin-series resin, rosin-denatured maleic acid resin or wax emulsion to the kraft paper or impregnate said kraft paper with any of the above-listed materials. Particularly preferred is the application of the styrene-maleic anhydride copolymer.

Other than above-mentioned high quality kraft paper, plastics material such as paper made from synthetic pulp or unwoven fabric may be employed as the paper layer 1a. The plastics layer 1b is prepared from butyral resin butylated about 78 to about 86% and having an average polymerization degree of more than 500, or preferably 500 to 1,500. The plastics layer 1b may be formed of a combination of said butyral resin and less than 40% by weight of, for example, ethyl cellulose, nitrocellulose, acrylic resin, polyester resin, cyclized rubber or polyamide resin.

Any of the above-listed resins is dissolved in an organic solvent such as isopropyl alcohol, ethyl acetate, or toluene or a mixture thereof and is applied to the surface of the paper layer 1a to form the plastics layer 1b. In this case, the amount of plastics material applied is chosen to range between 0.5 and 4.0 g/m$^2$ or preferably between 0.5 and 2.5 g/m$^2$ from the standpoint of preventing the generation of paper particles, facilitating the opening of the package and ensuring the waterproofness and gas permeability of said plastics layer 1b.

The base plate 1 formed of the resin-coated kraft paper is chosen to have a Gurley gas permeability ranging between 50 to 500 sec/100 cc of air or preferably between 65 and 300 sec/100 cc of air in accordance with the concentration and applied amount of the above-mentioned resin solution.

Figure 3:
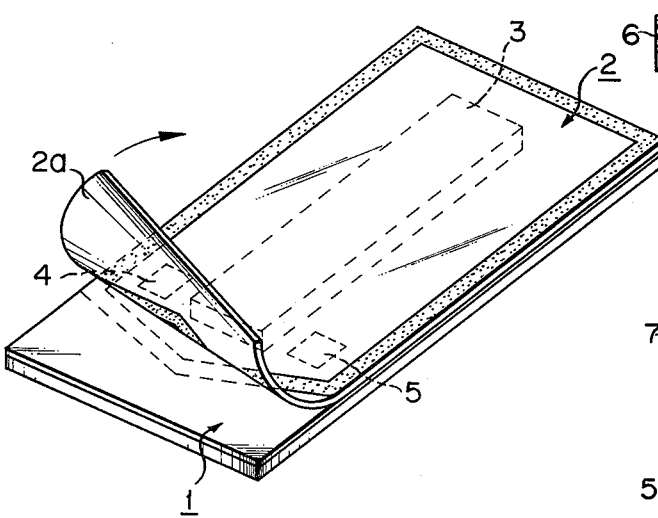
FIG. 3 is an oblique view of the package for sterilization shown in FIG. 1, when opened to take out a packaged article.

The edge of the plastics covering sheet 2 is heat-sealed to the peripheral portion of the plastics layer 1b with a prescribed width to constitute a sealed package body for receiving an article 3 being sterilized between said covering sheet 2 and base plate 1. In this case, the heat-sealed edge portion 2b of the covering sheet 2 may be so formed as to allow part of said covering sheet 2 to be used as a grasp strip 2a. When, therefore, the package is to be opened, the heat-sealed edge portion 2b can be easily peeled off by pulling the grasp strip 2a in the direction of the arrow indicated in FIG. 3.

Figure 4:
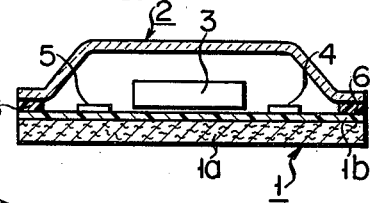
FIG. 4 is a sectional view of a package for sterilization according to another embodiment.
Figure 5:
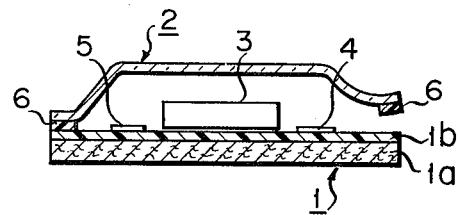
FIG. 5 is a sectional view of the package for sterilization shown in FIG. 4 when opened to take out a packaged article.

The plastics covering sheet 2 should preferably be formed of polypropylene or a laminate film prepared from polypropylene and any other synthetic resin. The laminate film is chosen to be heat-resistant and transparent and concretely includes polypropylene-polyester film, polypropylene-polyamide film, polypropylene-polyimide film and polypropylene-polycarbonate film. In any case, the polypropylene layer is preferred to constitute that side of the covering sheet 2 which is bonded to the base plate 1. Polyethylene or a laminate thereof with any other material is unadapted for sterilization by steam in an autoclave due to a low heat resistance. The edge portion 2b of the covering sheet 2 heat-sealed to the base plate 1 preferably has only sufficient bond strength to be easily peeled off by hand. Namely, a bond strength of about 75 to 500 g/15 mm (a valve indicated when the heat-sealed edge portion 2b 15 mm wide is pulled through an angle of 180°) is generally desired from the standpoint of ensuring the mechanical strength of the package and the easy peel of the heat-sealed edge portion 2b.

Where the edge portion 2b of the plastics covering sheet 2 heat-sealed to the plastics layer 1b of the base plate 1 is required to have a great bond strength, then it is advisable to form an additional heat seal layer 6 on the plastics layer 1b as shown in FIGS. 4 and 5 and heat-seal the covering sheet 2 to the base plate 1 with the additional heat seal layer 6 used as an interleaf. Said additional heat seal layer 6 should preferably be prepared from chlorinated polypropylene. The heat seal layer 6 may be deposited only on the heat-sealed edge portion 2b, as shown in FIGS. 4 and 5, or all over the plastics layer 1b of the base plate 1. The package of FIGS. 4 and 5 can be opened in the same manner as that of FIG. 3. In this case, peeling takes place, as shown in FIG. 5, between the additional heat seal layer 6 and the plastics layer 1b of the base plate 1.

The base plate 1 of a package for sterilization embodying this invention is formed of a laminate of a paper layer and a butyral resin layer or another resin layer deposited on said butyral resin so as to ensure the gas permeability of the base plate 1. Even when exposed to steam at about 120° C., the base plate 1 has little tendency to be softened, is well resistant to the effect of water drops, and is saved from fusion to a packaged sterilized article. Therefore, the present sterilization package admits of stable sterilization by gas such as ethylene oxide as well as by steam, offering considerable advantage in sterilization treatment.

When the sterilization package of this invention is opened, peeling takes place between the covering sheet 2 and the platics layer 1b of the base plate 1, preventing the paper layer of the base plate 1 from being torn to pieces, and thereby suppressing the pollution of a packaged sterilized article by paper particles generated when the package is opened, as has undesirably occurred in the prior art sterilization package.

Figure 6:
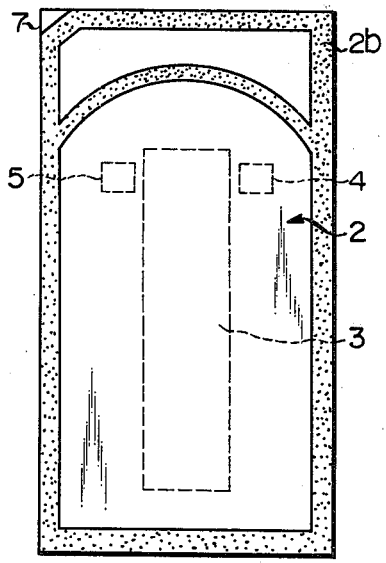
FIG. 6 is a plan view of a package according to another embodiment of the invention.

A package of FIG. 6 according to another embodiment of this invention is different from that of FIG. 1 in that in the embodiment of FIG. 6 that side of the heat-sealed portion 2b on which peeling is commenced has an arciform to admit of easy peeling, whereas, in the embodiment of FIG. 1, the peel-starting side of the heat-sealed portion 2b has an angular convex form, and that in the embodiment of FIG. 6, substantially all the periphery of the package is heat-sealed with a triangular grip strip 7 provided in one corner. The embodiment of FIG. 6 has the advantage that since only a small grip strip 7 is left on the package there is less possibility than in the embodiment of FIG. 1 that dust or dirt is gathered in a space lying between the grip strip 7 and package or said intervening space is contaminated by any other foreign matter.

Since the sterilization package of this invention is adapted for sterilization by gas such as ethylene oxide as well as by steam, for example, in an autoclave, the surface of the plastics layer 1b of the base plate 1 is impressed with both gas sterilization indicator 4 and steam sterilization indicator 5. Since the covering sheet 2 is formed of transparent material, the indicators 4, 5 can be observed from the outside. The indicators 4, 5 which present a discolorment, for example, from red to blue enable the completion of sterilization to be recognized by the eye.

There will now be described a sterilization indicator used with the sterilization package of this invention. The sterilization indicator is applied in the form impressed, as described above, on the package itself or a piece of paper and received in the package with an article 3 being sterilized. Therefore, the following description refers to the composition of a printing ink used with the sterilization indicator.

An indicator ink composition for use with ethylene oxide gas is explained in the following description. This indicator enables the completion of disinfection of a medical instrument received in the package to be visibly displayed by an irreversible color change caused by reaction between the indicator and ethylene oxide gas.

The indicator ink composition to be used for a package of this invention is obviously not only provided with such fluidity and adhesivity as are demanded of an ordinary form of ink, but also contains calcium halide capable of producing alkaline calcium hydroxide by reaction with ethylene oxide as expressed by the following chemical formula (where X denotes a halogen element).

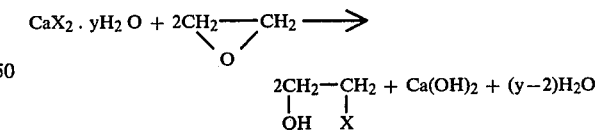

and two or more indicators which present color change between pH 2 and pH 10.

Where the indicator ink composition of this invention has to hold acidity before reaction with ethylene oxide, then the ink composition is mixed with an organic acid such weak alkalinity, it is advised to add, for example, hexamethylene tetramine to said ink composition. Where the indicator prevents color change in an acid region having a smaller pH level than 7, then the latter additive (hexamethylene tetramine) is mixed with the ink indicator, if the indicator shows color change in a neutral or weak alkaline pH region. In any case, the color-presenting reaction of the indicator with ethylene oxide gas which results from the growth of an alkaline material as seen from the above chemical formula detects completion of disinfection. Therefore, application of metal halide, for example, calcium bromide (CaBr$_2$.2H$_2$O) offers convenience, because reaction of said metal halide with ethylene oxide produces calcium hydroxide (Ca(OH)$_2$) having relatively high alkalinity. Further, the ink composition of this invention which includes two or more pH indicators enables color change to proceed stepwise, and consequently the progress of disinfection to be distinctly recognized by the condition of color change.

There will now be described a combination of indicator. For instance, bromocresol green (BCG) combined with methyl yellow (MY) presents a bright red color in an acid region and a bluish green color in an alkaline region. Bromothymol blue (BTB) combined with methyl red (MR) displays color shift from red to bluish green with a neutral region substantially taken as a border. The ink composition of this invention which contains at least two indicators displays a color shift from red to bluish green according as reaction proceeds between said composition and ethylene oxide. In this case, a color produced remains unchanged for a sufficient length of time and moreover shows an increased shade.

Some ink compositions including indicators are given below.

Ink composition 1:

| Ingredients | Parts by weight |
| --- | --- |
| Ethyl cellulose | 120 |
| Calcium bromide (CaBr$_2$ . 2H$_2$O) | 30 |
| Citric acid | 10 |
| Bromocresol green | 2 |
| Methyl yellow | 1 |
| Ethyl acetate | 150 |
| Isopropyl alcohol | 150 |

Ink composition 2:

| Ingredients | Parts by weight |
| --- | --- |
| Ethyl cellulose | 12 |
| Calcium bromide (CaBr$_2$ . 2H$_2$O) | 7 |
| Bromothymol blue | 1 |
| Methyl red | 0.5 |
| Hexamethylene tetramine | 4 |
| Ethyl acetate | 30 |
| Isopropyl alcohol | 40 |

However, the ethylene oxide sterilization indicator 4 is not limited to the type which comprises the above-mentioned halogenated calcium. Namely, potassium iodide (KI) and sodium thiosulfate (Na$_2$S$_2$O$_3$) may be used instead. Further, potassium bromide (KBr), sodium sulfite (NaSO$_3$) and sodium nitrite (NaNO$_2$), for example, are also available for use. Those indicator compounds may collectively be referred to as alkali metal compounds.

Products resulting from reaction between the indicator compounds and ethylene oxide are potassium hydroxide (KOH) and sodium hydroxide (NaOH) both having high alkalinity, as seen from the following reaction formulas:

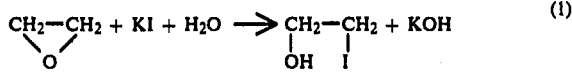

(1)

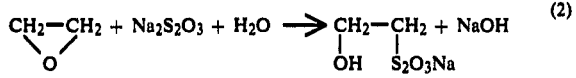

(2)

Therefore, the pH value of the indicator ink containing the above-mentioned hydroxide compounds is noticeably transferred to the alkaline side. This fact makes it possible to select the pH indicator over a broad range. For the object of this invention, at least two types of pH indicator should obviously be used as in the case of the aforesaid ink compositions 1 and 2.

Indicator ink composition 3

| | Parts by weight |
| --- | --- |
| Ethyl cellulose | 30 |
| Titanium white (white pigment) | 2.5 |
| Potassium iodide (KI) | 8.0 |
| Citric acid | 2.5 |
| Bromocresol green | 1.0 |
| Methyl red | 0.5 |
| Ethanol | 55.5 |

Indicator ink compositions 4

| | Parts by weight |
| --- | --- |
| Ethyl cellulose | 30 |
| Titanium white (white pigment) | 2.5 |
| Sodium thiosulfate (Na$_2$S$_2$O$_3$) | 7.6 |
| Citric acid | 2.5 |
| Bromocresol green | 1.0 |
| Methyl red | 0.5 |
| Ethanol | 55.5 |

The above-mentioned indicator ink compositions 3 to 4 have the color changed stepwise from red to blue when sterilization is carried out by ethylene oxide gas.

Description is given of the composition of a printing ink applied to a steam sterilization indicator. The ink essentially includes an inorganic pigment of ultramarine and inorganic alkali salt, and obviously has a sufficient degree of viscosity and adhesivity for printing.

The ultramarine is a purplish blue pigment whose composition is generally expressed by the chemical formula of Fe$_4$[Fe(CN)$_6$]$_3$. The ultramarine is decomposed into iron hydroxide and yellow prussiate of potash, and is discolored from blue to yellow. This discoloring property is utilized to apply the ultramarine as a steam sterilization indicator ink. Namely, the steam sterilization indicator ink includes the types whose main component is formed of the ultramarine and inorganic alkali salt such as sodium bicarbonate or sodium carbonate, and whose resinous component is a xylene solution of lime rosin, a methyl ethyl ketone solution of vinyl chloride-vinyl acetate copolymer, or a xylene solution of rosin-denatured maleic acid resin. An impression made by a steam sterilization indicator ink finely dispersed in, for example, a ball mill is conveniently discolored stepwise from blue to yellow in steam at 95° to 115° C. A length of time required for discolorment starting from a blue color is 3 to 6 minutes to indicate a green color, 6 to 10 minutes to show a yellowish green and 10 to 15 minutes to present a yellow color.

Various composition of the steam sterilization indicator ink are given below for illustration:

| Composition 5 | % by weight |
| --- | --- |
| Ultramarine | 1.10 |
| Sodium bicarbonate | 21.98 |
| 15% xylene solution of lime rosin | 65.94 |
| Toluene | 10.98 |

| Composition 6 | % by weight |
| --- | --- |
| Ultramarine | 1.27 |
| Sodium carbonate | 22.78 |

| -continued | |
|---|---|
| 8% ethylester solution of nitrocellulose | 75.95 |

Selection of the form of sterilization to which the present sterilization package is applied, that is, sterilization either by ethylene oxide gas or by steam is left to the user's choice. Obviously, an indicator impression can be made from either of the above-mentioned two compositions of the indicator ink according to the user's specification.

This invention will be more fully understood by reference to the examples which follow.

EXAMPLE 1

10% solution of butyral resin having the undermentioned composition was applied on a sheet of sterilization paper at the rate of 2 g/m² to provide a laminate base plate.

| Butyral resin solution: | |
|---|---|
| Butyral resin; | 80 parts by weight |
| Solvent; formed of 50 parts by weight of isopropyl alcohol, 40 parts by weight of ethyl acetate and 10 parts by weight of toluene | |
| Nitrocellulose resin; | 20 parts by weight |

A plastics covering sheet was formed of a film laminate prepared from polyester film 12μ thick and non-stretched polypropylene film 50μ thick. The edge of the plastics covering sheet was heat-sealed to the laminated base plate to provide a package for sterilization. The laminated base plate of the present sterilization package was sized for 40 seconds. Gauze placed in the sterilization package was sterilized by ethylene oxide gas as well as by steam in an autoclave, presenting a highly sterilized condition. The sterilization package enabled the packaged gauze to be stored in a sterilized state for a longer period than one year, without the possibility of being polluted. The package was easily opened without generation of paper particles and consequently without the possibility of the gauze being polluted by paper particles.

| Condition of sterilization by ethylene oxide gas: | |
|---|---|
| Temperature | 50° C. |
| Humidity | 50% |
| Gas applied | Ethylene oxide gas and carbon dioxide gas were mixed in the ratio of 2:8; the concentration of ethylene oxide gas was chosen to be 600 mg/l. |
| Time of sterilization | 4 hours |
| Condition of sterilization by steam in an autoclave: | |
| 20 minutes at 121° C. | |

EXAMPLE 2

The surface of a bleached kraft paper sheet was coated with styrene-maleic anhydride copolymer at the rate of 1 g/m². 10% solution of butyral used in Example 1 was applied as a plastics layer on the paper layer at the rate of 1.5 g/m² to provide a laminated base plate. Chlorinated polypropylene resin was applied as a heat seal layer at the rate of 1 g/m² only on the heat seal portion of the laminated base plate. The laminated base plate now carrying the heat seal layer and the same type of laminate film as used in Example 1 were heat-sealed together to provide a sterilization package. The laminated base plate of the sterilization package was well sized for 50 seconds.

Gauze placed in the package was sterilized under the same conditions as in Example 1, giving as good results as in Example 1.

As apparent from the foregoing examples, a sterilization package embodying this invention is adapted for sterilization by ethylene oxide gas as well as by steam in an autoclave. The package can be easily opened without the possibility of paper particles being generated and in consequence without the possibility of a packaged article being polluted by paper particles, and moreover enables the packaged article to be kept sterilized long until the time of practical application arrives.

What we claim is:

1. A package for sterilization adapted for sterilization by gas as well as by steam which comprises a waterproof and gas permeable base plate formed of a paper layer having a sizing degree of at least 30 second and coated on its surface with 0.5 to 4.0 g/m² of a plastics layer containing at least 60% by weight of butyral resin having an average polymerization degree of 500 to 1,500; a plastics covering sheet selected from the group consisting of polypropylene film and polypropylene-laminated film, which is heat-sealed at its edge with the polypropylene layer being kep downward to the plastics layer of the base plate around a packaged article; and either a gas sterilization indicator or a steam sterilization indicator provided in the interior of the package.

2. The package for sterilization according to claim 1, wherein the butyral resin is butylated about 78% to about 86%.

3. The package for sterilization according to claim 1, wherein the polypropylene-laminated film is selected from the group consisting of polypropylene-polyester film, polypropylene-polyamide film, polypropylene-polyimide film and polypropylene-polycarbonate film.

4. The package for sterilization according to claim 1, wherein the plastics layer of the base plate contains 40% or less by weight of at least one resin selected from the group consisting of ethyl cellulose, nitrocellulose, acrylic resin, polyester resin, cyclized rubber and polyamide resin.

5. The package for sterilization according to claim 1, wherein the paper layer is preliminary coated with styrene-maleic anhydride copolymer.

6. The package for sterilization according to claim 1, wherein the laminated base plate has a Gurley gas permeability of 50 to 500 sec/100 cc of air.

7. The package for sterilization according to claim 1, wherein at least that side of the base plate which is bonded to the covering sheet is further coated with chlorinated polypropylene resin.

8. The package for sterilization according to claim 1, wherein the edge portion of the covering sheet heat-sealed to the base plate has a bond strength of 75 to 500 g/15 mm.

* * * * *